United States Patent [19]
Medsker

[11] Patent Number: 5,303,959
[45] Date of Patent: Apr. 19, 1994

[54] HIGH SPEED ROTARY JOINT

[75] Inventor: James A. Medsker, Lawton, Mich.

[73] Assignee: The Johnson Corporation, Three Rivers, Mich.

[21] Appl. No.: 11,903

[22] Filed: Feb. 1, 1993

[51] Int. Cl.[5] ............................................. F16L 35/00
[52] U.S. Cl. .................................... 285/24; 285/134; 285/276; 285/281; 285/375
[58] Field of Search ............... 285/276, 277, 281, 355, 285/390, 24, 267, 279, 375

[56] References Cited

U.S. PATENT DOCUMENTS

| | | | |
|---|---|---|---|
| 2,384,281 | 9/1945 | Carter | 285/375 X |
| 2,727,760 | 12/1955 | Fawick | 265/375 X |
| 3,242,583 | 3/1966 | Calkins | 34/18 |
| 3,498,591 | 3/1970 | Calkins | 263/6 |
| 3,594,019 | 7/1971 | Gotschall et al. | 285/14 |
| 3,606,394 | 9/1971 | Maurer et al. | 285/134 |
| 3,874,707 | 4/1975 | Calkins | 285/93 |
| 4,254,972 | 3/1981 | Wiedenbeck et al. | 285/61 |
| 4,262,940 | 4/1981 | Wiedenbeck et al. | 285/61 |
| 4,606,561 | 8/1986 | Jackson | 285/134 |
| 4,635,969 | 1/1987 | Jackson | 285/95 |
| 4,758,026 | 7/1988 | Timm | 285/134 |
| 4,817,995 | 4/1989 | Deubla et al. | 285/276 X |
| 5,165,734 | 11/1992 | Smith | 285/276 |

Primary Examiner—Dave W. Arola
Attorney, Agent, or Firm—Beaman & Beaman

[57] ABSTRACT

A rotary joint for supplying and/or removing a fluid heat transfer medium to/from a rapidly rotating roll or drum supported upon journals. The rotary joint nipple threads into the journal bore and closely fitting complementarily shaped cylindrical surfaces on the journal end and joint nipple interengage to concentrically relate the joint to the journal, and engaging radial surfaces on the journal and nipple further coaxially position the joint with respect to the journal to prevent relative tilting. In an embodiment the joint nipple includes an internal seal ring axially biased against a counterseat to reduce the rotary joint axial dimension and permit utilization of wider spaced bearings which improves stability, balances bearing loads and increases bearing life.

9 Claims, 1 Drawing Sheet

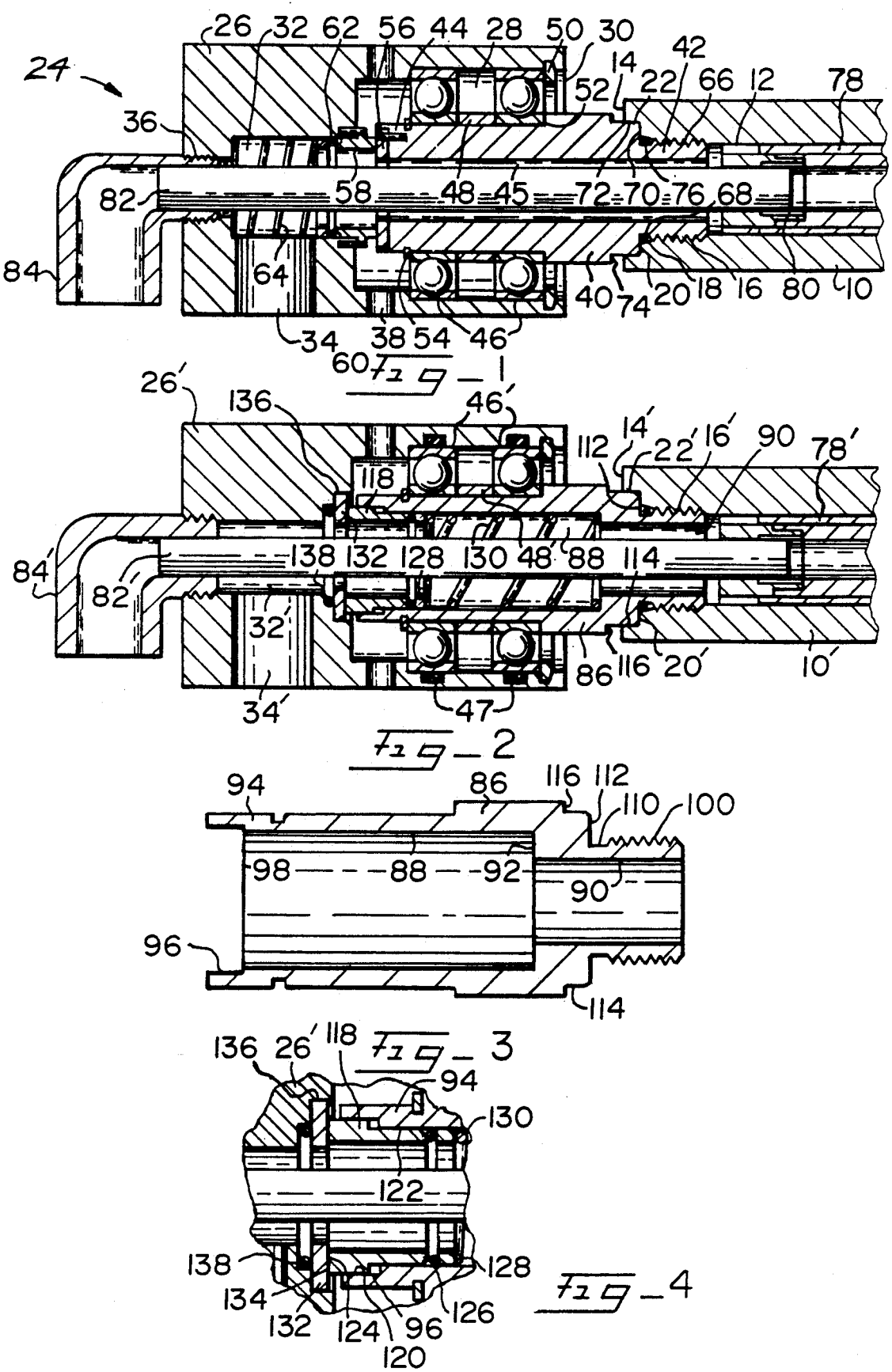

HIGH SPEED ROTARY JOINT

BACKGROUND OF THE INVENTION

1. Field of the Invention

The invention pertains to rotary joints for supplying heat transfer medium to rotating drums or rolls and is particularly suitable for use with rapidly rotating drums or rolls requiring a high degree of mounting accuracy of the rotary joint on the drum journal.

2. Description of the Related Art

Rotating drums and journals containing hot or cold heat transfer mediums such as water or stream are commonly used in the manufacture of paper, fabric and the like. The article being treated passes over the drum or roll periphery during heat transfer, and paper producing mills, for instance, use many such rotating drums to control the paper moisture content and other product characteristics. Over the years, the assignee has developed a variety of rotary joints adapted to be mounted upon a journal of a rotating drum or roll to permit steam or water to be introduced into the drum, or removed therefrom, and reference is made to U.S. Pat. Nos. 3,242,583; 3,498,591; 3,594,019; 3,606,394; 3,874,707; 4,254,974; 4,262,940; 4,606,561 and 4,758,026. Such patents are typical of rotary joint constructions used to introduce or remove heat transfer medium relative to rotating drums or rolls.

In the color printing industry heat transfer drums and rolls are used which rotate at considerably higher rates of revolution than used in paper and fabric manufacture. For instance, the color printing industry utilizes drums or rolls rotating up to 6,000 RPM. In such installations the rotary joints used with such apparatus must be capable of handling the high rates of revolutions and still maintain the required fluid tight relationships between the seals necessary to prevent leakage and provide an effective flow of heat transfer medium to or from the rotating roll or drum.

With journals rotating up to 6,000 RPM conventional apparatus for mounting the rotary joint upon the journals is unsatisfactory due to the very accurate requirements for concentrically mounting the joint with respect to the axis of journal rotation. It is known to thread the rotary joint nipple into the threads of the journal bore, however, such threaded connections do not assure concentricity because of the tolerances in the threads, and the use of gaskets between the journal and joint nipple permits the gaskets to be unevenly compressed resulting in eccentricity of the joint nipple axis of rotation with respect to the journal rotation axis.

OBJECTS OF THE INVENTION

It is an object of the invention to provide a high speed rotary joint for attachment to rotating heat exchanger journals wherein the joint nipple axis of rotation is accurately oriented to the journal axis of rotation in a coaxial manner, and maintains this aligned relationship over long periods of operation.

Another object of the invention is to provide a high speed rotary joint for rapidly rotating heat exchanger journals wherein a threaded interconnection exists between the journal and the joint nipple and piloting cylindrical reference surfaces and flat reference surfaces formed on the journal and nipple engage in metal-to-metal relationship to accurately relate the journal and nipple regardless of thread tolerances.

An additional object of the invention is to provide a rotary joint for rotating journals utilizing a seal ring and counterseat in a sealing relationship between rotating and stationary joint components wherein widely spaced bearings can be accommodated within a rotary joint of minimal axial dimension.

SUMMARY OF THE INVENTION

The high speed roller or drum with which the rotary joint of the invention is used includes a journal extending through the drum support bearings, and the journal is tubular communicating with the drum interior. The end of the journal is machined with a flat surface perpendicular to the journal axis, and the journal bore is threaded adjacent the journal end. However, intermediate between the threads and the journal end a cylindrical pilot surface intersecting the journal end is formed in the journal concentric to its axis, and an inner radial shoulder surface intersecting the cylindrical surface is also defined in the journal intersecting the bore. The shoulder is perpendicular to the journal axis. Syphon pipe structure may be located within the journal bore if the rotary joint employs syphon piping.

The rotary joint comprises a housing having at least one port defined therein which communicates with a housing chamber. The housing includes bearings rotatably supporting a tubular nipple having an outer end extending from the housing for attachment to the journal end. The outermost portion of the nipple outer end is threaded for mating with the journal bore threads, and the nipple outer end includes a cylindrical piloting reference surface concentric to the nipple axis for tight reception within the journal end cylindrical reference surface. Additionally, the nipple outer end includes a flat reference shoulder perpendicular to the nipple axis for engaging the journal shoulder. The journal and nipple cylindrical reference surfaces and shoulder reference surfaces engage in a metal-to-metal relationship, and upon threading the nipple outer end into the journal ends the nipple axis will be maintained in an accurate coaxial relationship to the journal axis.

The nipple inner end includes sealing structure for sealing the rotating nipple with respect to the stationary joint housing under the relative rotating relationship which exists, and this sealing structure communicates with a housing chamber ported to communicate with a fluid medium supply source or discharge conduit system. If desired, the rotary joint housing may include a fitting and port for accommodating syphon pipe structure communicating with a journal syphon pipe.

In an embodiment of the invention, the nipple is formed with a bore of a large enough diameter to internally accommodate an elongated seal ring and spring assembly. In this embodiment the counterseat associated with the seal ring is mounted upon the rotary joint housing, and by incorporating the seal ring and compression spring within the nipple the spacing between the bearings can be increased for improved stability, and in fact, the housing length may be reduced when using this embodiment.

The metal-to-metal engagement of the piloting and abutment reference surfaces of the journal and rotary joint permit the joint nipple to be very accurately oriented with respect to the journal and the practice of the invention permits rotary joints to be used in high speed environments while still maintaining effective joint sealing for extended periods of time.

BRIEF DESCRIPTION OF THE DRAWINGS

The aforementioned objects and advantages of the invention will be appreciated from the following description and accompanying drawings wherein:

FIG. 1 is a diametrical sectional view of a rotary joint and journal utilizing the inventive concepts, the rotary joint and journal being shown in the fully assembled operative relationship, FIG. 2 is a diametrical sectional view of another embodiment of rotary joint illustrated in a connected relationship to a journal, the joint nipple employing an internal seal ring and compression spring, FIG. 3 is a diametrical elevational sectional view of the rotary joint nipple, per se, illustrated in FIG. 2, and FIG. 4 is an enlarged diametrical elevational sectional view of the seal ring and counterseat relationship shown in FIG. 2.

DESCRIPTION OF THE PREFERRED EMBODIMENTS.

With reference to FIG. 1, the journal of a heat exchanger drum or roll is generally indicated at 10. The journal 10 will normally be mounted in bearings, not shown, and each end of the heat exchanger drum or roll, not shown, will include a journal 10 for rotatably supporting the heat exchanger.

The journal 10 includes a coaxial bore 12 intersecting the journal end 14 which comprises a flat surface perpendicularly disposed to the journal axis. The bore 12 is provided with internal threads 16, and the journal may be chamfered at 18 adjacent the threads. A radial reference shoulder 20 is defined on the journal which lies in a plane perpendicular to the journal axis, and the shoulder 20 intersects the cylindrical piloting reference surface 22 intersecting the bore end 14. The surface 22 is accurately concentrically machined relative to the journal axis of rotation.

The rotary joint in accord with the invention is generally indicated at 24, and includes a metal housing 26 of an elongated configuration. The housing 26 includes an internal recess 28 which intersects the housing open end 30, and the housing also includes an inner chamber 32 concentric to the housing axis. A port 34 defined in a side of the housing 26 is in communication with the chamber 32, and may be threaded or other connection means, not shown, associated therewith for attaching a conduit, not shown, to the port 34. A threaded port 36 may be defined in the housing 26 coaxial with the housing axis for receiving a syphon fitting, as later described. Vents 38 formed in the housing communicate with the recess 28 to permit coolant escaping from the joint seals to be vented to the atmosphere.

The tubular nipple 40 partially located within the recess 28 includes an outer end 42 extending from the housing, and an inner end 44. The nipple includes a bore 45, and the nipple is rotatably supported within the housing recess 28 by a pair of ball bearings 46 separated by an annular spacer 48. A snap ring 50 received within a housing groove maintains the bearings within the recess 28, and a radial shoulder 52 defined upon the nipple associating with the outermost bearing in conjunction with the snap ring 54 received within a nipple groove axially relates the bearings 46 and the nipple 40 to prevent relative axial displacement between the nipple and housing 26.

The inner end of the nipple 40 is provided with an annular counterseat 56 which is anchored against rotation by an anchor pin, and the outer face of the counterseat 56 constitutes a sealing surface for cooperation with the seal ring as later described. The aforementioned relationship between the counterseat 56 and the seal ring is similar to that described in the assignee's U.S. Pat. No. 4,606,561.

An annular seal ring 58 is mounted within the chamber 32 coaxial to the housing axis, and the seal ring is formed of a hard seal material and is anchored against rotation relative to the housing 26 by anchor pins. An O-ring engages the inner end of the seal ring 58, and the O-ring is compressed by an annular brass follower 62 which is biased into engagement with the O-ring by the compression spring 64 located within chamber 32. The spring 32 thereby imposes an axial biasing force on the seal ring 58, which is capable of limited axial displacement relative to the chamber 32, to accommodate counterseat and seal ring wear.

The nipple outer end 42 is provided with threads 66 which cooperate with the journal threads 16, and the nipple is countersunk at 68 adjacent the nipple radial reference shoulder 70 which is flat and perpendicular to the nipple axis. The nipple outer end also includes a cylindrical reference surface 72 accurately machined to be concentric to the nipple axis and of a diameter substantially the same as the journal surface 22, however, the diameter of the surface 72 may be slightly smaller than the diameter of surface 22, but the dimensions are such that a snug metal-to-metal contact between the surfaces exists when the nipple is assembled to the journal.

The nipple outer end also includes a flat radial shoulder 74 which is perpendicular to the nipple axis, and is axially spaced from the journal end 14. A resilient O-ring 76 is located on the nipple between the threads 66 and shoulder 70, and this O-ring establishes a fluid tight connection between the journal and nipple.

A syphon tube 78 may be located within the journal bore 12, and the syphon tube 78 will communicate with a syphon within the heat exchanger drum or roll, not shown. The syphon tube may include a bearing 80 for rotatably receiving the rotary joint internal pipe 82 which communicates with the elbow fitting 84 threaded into the housing port 36, and in this manner the tube 78, pipe 82 and elbow 84 constitute a condensate removal system optionally usable with the disclosed rotary joint. Of course, if a syphon system is not used with the joint the port 36 may not be formed in the housing, or may be plugged.

To connect the rotary joint 24 to the journal 10 the nipple threads 66 are fully threaded into the journal bore threads 16, and the axial displacement of the nipple 40 toward the journal 10 causes the surface 72 to be tightly received within the bore surface 22. The nipple will continue to be rotated relative to the journal until the shoulder 70 engages the bore shoulder 20. This multiple metal-to-metal engagement between the nipple 40 and the journal 10 very accurately coaxially relates the axes of the nipple and journal regardless of inaccuracies in the threads 16 or 66, and use of the O-ring 76, in addition to the metal-to-metal surface engagements, produces a fluid tight relationship between the nipple and the journal and permits the rotary joint 24 to be used with high speed journals in view of the very accurate mounting of the nipple upon the journal.

In FIGS. 2 – 4, a variation in the joint construction is illustrated, and in this embodiment the mounting of the nipple upon the journal is identical to that previously described above, and with respect to FIGS. 2 – 4 components similar to those previously described are indicated by primed reference numerals.

In the embodiment of FIG. 2 the outer races of the bearings 46' are prevented from rotating by the use of O-rings 47 received within annular grooves formed in housing 26'. The O-rings 47 eliminate the necessity to heat the housing 26' during assembly to achieve an interference fit with the bearing races, as is the usual mode of assembly, and assembly of the rotary joint can be made without special tools or heating.

In the embodiment of FIGS. 2 – 4 the nipple 86 is of the configuration best illustrated in FIG. 3. The nipple 86 includes a large concentric cylindrical bore 88 intersecting a smaller diameter bore 90 which intersects the nipple outer end. The intersection of the bores 88 and 90 is at the radial shoulder 92. The nipple includes the inner end 94 and an enlarged cylindrical recess 96 is defined in the inner end 94 by diametricially opposed axial ears intersecting the end of the nipple and the recess includes a radial shoulder 98 with respect to the bore 88.

The nipple threads 100 mate with the syphon bore threads 16', and the nipple is recessed at 110 in order to receive an O-ring similar to that shown at 76 described above. The nipple also includes a radial shoulder 112 lying in a plane perpendicular to the nipple axis and the cylindrical surface 114 is concentric to the nipple axis. The second radial shoulder perpendicular to the nipple axis is represented at 116, and the shoulders 112 and 20', and the cylindrical surfaces 114 and 22' cooperate with each other, respectively, in the manner described above to very accurately coaxially mount the nipple 86 with respect to the journal 10'.

In the embodiment of FIGS. 2 – 4 the annular seal ring 118 is of the configuration best appreciated from FIG. 4 and includes an enlarged shoulder diameter 120 slidably received within the nipple recess 96. The seal ring 118 also includes a smaller diameter 122 slidably received within the nipple bore 88. The seal ring 118 includes the end seal surface 124, and a resilient O-ring 126 bears against the opposite end of the seal ring and is engaged by the annular brass follower 128 which is biased against the O-ring by the compression spring 130 which also bears against the nipple shoulder 92. In this manner, the seal ring 118 rotates with the nipple and is baised to the left as illustrated in the drawings.

The annular counterseat 132 is mounted within the rotary joint housing 26' in a coaxial relationship to the seal ring 118, and includes a flat seal surface 134 engaging the seal ring surface 124 in a sealed relationship. The counterseat 132 is provided with a flat 136 in its periphery which cooperates with a flat in housing 26' which prevents rotation of the counterseat 132, and the resilient O-ring 138 seals the counterseat with respect to the housing 26'. It will be appreciated that in the aforedescribed embodiment the seal ring 118 is substantially fully received within the axial dimension of the nipple 86, and this construction permits the bearings 46 to be axially spaced apart a greater distance although such greater spacing is not apparent in FIG. 2 without adding to the overall length of the rotary joint 26. The location of the seal ring 118 and its associated components, including the spring 130, permits these components to be axially accommodated within the axial dimension of the nipple 86, and with this construction permitting a greater spacing between bearings 46, improved stability of the joint is achieved, a better balance of the bearing loads occurs and an increased bearing life is experienced. Internal displacement of the seal ring 118 into the nipple is limited by engagement of the diameter 120 with the shoulder 98, and the embodiment of FIGS. 2 – 4 may be readily assembled without requiring unusual skills.

It will be appreciated from the above description that a rotary joint is disclosed capable of a long effective life in a high speed heat exchanger environment. The use of the metal-to-metal engagement of the journal and nipple radial and cylindrical reference surfaces assures a coaxial relationship between the axes of the journal and nipple, and a rotary joint constructed in accord with the inventive concepts is capable of high speed operation without imposing undue stress upon the rotary joint components and the conduits associated therewith. It is appreciated that various modifications to the inventive concepts may be apparent to those skilled in the art without departing from the spirit and scope of the invention.

I claim:

1. A high speed rotary joint for attachment to the end of a metal rotating journal having an axis of rotation and an end comprising, in combination, a threaded bore defined in the journal concentric to the journal axis and intersecting the journal end, a first circular recess reference surface defined on the journal intersecting the journal end and concentric to the journal axis, a second reference surface defined on the journal end radially and axially inward of said first surface and transversely related to and concentric to the journal axis, a rotary joint having a housing, at least one port defined in said housing, a tubular metal nipple having a axis and means rotatably mounting said nipple within said housing, said nipple being in communication with said port and having an outer end extending exteriorly from said housing, threads defined on said nipple outer end for mating with said journal threaded bore, a third circular reference surface defined on said nipple outer end concentric to said nipple axis complementary in configuration to said first reference surface, and a fourth reference surface defined on said nipple outer end radially inward and axially outward of said third surface and transversely related to and concentric to said nipple axis and complementary in configuration to said second reference surface, said first and third reference surfaces, and said second and fourth reference surfaces, respectively, engaging metal-to-metal upon said nipple outer end being fully threaded into said journal threaded bore to accurately co-align the axes of the journal and said nipple.

2. In a high speed rotary joint as in claim 1, said first and third reference surfaces being cylindrical.

3. In a high speed rotary joint as in claim 2, said second and fourth reference surfaces being substantially flat and perpendicular to the journal axis and said nipple axis, respectively.

4. In a high speed rotary joint as in claim 1, an annular countersunk recess defined on said nipple outer end intermediate said nipple threads and said fourth reference surface, and an annular resilient seal ring within said recess.

5. A rotary joint for attachment to the end of a tubular rotating journal of a heat exchanger drum wherein the rotary joint includes a housing having an interior chamber, a port in communication with the chamber, a pair of axially spaced bearings within the housing rotatably supporting a tubular nipple having an axis and an inner end within the chamber and an outer end extending from the housing for connection to the drum journal, the improvement comprising, a cylindrical bore concentrically defined in the nipple intersecting the inner end thereof, a tubular seal ring axially displaceable within said bore and means for sealing said seal ring to said bore, said seal ring having a flat outer end sealing face extending from the nipple outer end perpendicular to the nipple axis and an inner end within said nipple bore, a spring within said nipple bore biasing said seal ring in the axial direction of the nipple inner end, an annular counterseat fixedly mounted on the housing against relative movement thereto concentric to the nipple axis in communication with the housing chamber having a flat face perpendicular to the nipple axis and concentrically sealingly and rotatably engaging said seal ring face, said spring maintaining said seal ring face in sealed engagement with said counterseat face during rotation of the nipple.

6. In a rotary joint as in claim 5, an enlarged diameter defined in said nipple bore intersecting the nipple inner end defining a radial shoulder axially spaced from the nipple inner end, said seal ring including an enlarged diameter received within said bore enlarged diameter defining a shoulder engageable with said bore shoulder to limit axial insertion of said seal ring into said nipple bore.

7. In a rotary joint as in claim 5, wherein said means for sealing said seal ring includes an annular resilient O-ring within said nipple bore in engagement with said seal ring inner end, an annular follower ring axially displaceable within said nipple bore engaging said O-ring to force said O-ring against said seal ring inner end to seal said seal ring relative to said nipple bore, said spring engaging said follower ring.

8. In a rotary joint as in claim 7, an annular concentric radial shoulder defined in said nipple bore axially spaced from and facing the nipple inner end, said spring comprising a compression 4 spring compressed between said bore shoulder and said follower ring.

9. In a rotary joint as in claim 5, the bearings each having an outer race, an annular resilient O-ring mounted in the housing in radial alignment with and firmly engaging each bearing outer race and said housing, said O-rings preventing rotation of said outer races with respect to the housing.

* * * * *